United States Patent [19]

Herrmann et al.

[11] Patent Number: 5,251,851
[45] Date of Patent: Oct. 12, 1993

[54] DOOR OPERATING MECHANISM FOR OPENING AND CLOSING AN AIRCRAFT DOOR IN RESPONSE TO A STORED PROGRAM

[75] Inventors: Dieter Herrmann, Norderstedt; Guenter Kallies, Hamburg, both of Fed. Rep. of Germany

[73] Assignee: Deutsche Aerospace Airbus GmbH, Hamburg, Fed. Rep. of Germany

[21] Appl. No.: 975,785

[22] Filed: Nov. 13, 1992

Related U.S. Application Data

[63] Continuation-in-part of Ser. No. 728,595, Jul. 11, 1991, Pat. No. 5,163,639.

[30] Foreign Application Priority Data

Jul. 11, 1990 [DE] Fed. Rep. of Germany ....... 4022067

[51] Int. Cl.$^5$ .............................................. B64C 1/14
[52] U.S. Cl. ................................ 244/129.5; 49/141
[58] Field of Search ........................ 244/129.5; 49/141

[56] References Cited

U.S. PATENT DOCUMENTS 4,680,891  7/1987  Perkins ........................ 244/129.5
4,720,065  1/1988  Hamatani ..................... 244/129.5

FOREIGN PATENT DOCUMENTS 0321994  6/1989  European Pat. Off. .

*Primary Examiner*—Michael S. Huppert
*Assistant Examiner*—Anne E. Bidwell
*Attorney, Agent, or Firm*—W. G. Fasse

[57] ABSTRACT

An operating mechanism for an aircraft door performs all the door motions and locking operations for the opening and closing of the door with the aid of electric motors which operate the respective elements of the mechanism through gear drives or through spindle drives to provide the power or torque moment for the respective motion. The motion sequence of the door operation is stored as a respective program in a memory of a central processing unit which in turn operates the electric motors in accordance with the programs. Operator initiated control signals are also provided to the central processing unit through respective panels. The pressurization and depressurization of the aircraft cabin is integrated into the door control so that pressurization cannot take place unless the doors are fully closed and locked and so that door opening cannot take place until depressurization is completed.

12 Claims, 6 Drawing Sheets

DOOR OPERATING MECHANISM FOR OPENING AND CLOSING AN AIRCRAFT DOOR IN RESPONSE TO A STORED PROGRAM

CROSS-REFERENCE TO RELATED APPLICATION

This application is a continuation-in-part application of our copending Ser. No.: 07/728,595; filed on Jul. 11, 1991, now allowed, U.S. Pat. No. 5,163,639.

FIELD OF THE INVENTION

The invention relates to an operating mechanism for opening and closing an aircraft door. In the closed position such doors must be brought into a formlocking relationship with the aircraft body structure. The required seal must be assured.

BACKGROUND INFORMATION

Aircraft doors must meet several requirements. On the one hand, during operation of the aircraft, the doors must be tightly locked and they must be capable of taking up all loads to which the doors may be exposed. On the other hand, it is necessary that such doors can be opened rapidly and simply in case of an emergency. For taking up all loads aircraft doors assume a formlocking position relative to the aircraft body structure in the closed state of a door in which the door is additionally locked. Doors for aircraft having a pressurized cabin must also be capable to withstand the internal cabin pressure during flight. In connection with passenger aircraft, the requirement must be met that each passenger door is equipped with an emergency slide which must be activated and deployed in an emergency through the operating elements of the door itself.

In order to establish a formlocking connection between the door and the aircraft body structure, and for transmitting the forces resulting from the internal cabin pressure, there are two door closure principles conventionally employed One principle is the so-called contact principle in which the door is brought into sealing contact with the door frame in the aircraft body structure. The other principle is the so-called toggle principle in which the door is closed in a sealing manner by means of toggle levers.

Doors constructed to operate in accordance with the contact principle comprise along their lateral rims or edges contact hardware. For closing such doors the doors are lowered subsequent to their being tilted into the body structure. The lowering of the closed door by a determined distance is such that the door hardware components contact and rest against respective body contact components and the cooperation of these components makes sure that all outwardly directed forces that are effective on the door are taken up safely.

Doors constructed to operate under the toggle lever principle are equipped along their lateral edges by rotatable toggles which, during the closing movement of the door, extend alongside the door edges and which enter into respective recesses in the door frame. In order to close the door the toggles are rotated within the recesses so that they extend crosswise rather than lengthwise to the door edge, whereby the required formlocking is achieved with the aircraft body structure.

In both types of doors the operational steps, such as closing, locking, activating of the emergency slide, and the respective opposite operations are performed manually. U.S. Pat. No. 4,720,065 (Hamatani), issued Jan. 19, 1988, discloses a door operating system in which the door closes in accordance with the above mentioned contact principle. The operating mechanism arranged inside the door according to U.S. Pat. No. 4,720,065, is so constructed that an operating motion introduced by means of a hand lever arranged on the side of the door facing into the cabin, is transmitted to a lifting shaft, to a closing flap, and to a locking mechanism of the emergency slide. The lifting shaft makes sure that upon opening the door, the door is lifted and that upon closing the door, the door is lowered. The operation of the known door will now be described by way of example, with reference to the sequence of operations occurring during the lifting and during the lowering of the door. The lifting shaft comprises a crank connected laterally to each end of the lifting shaft. These cranks enter with their crank arm into respective guide tracks when the door is swung into the closing position. For lowering the door the lifting shaft is then rotated with the hand operating lever of the door in such a way that the two crank arms travel upwardly on a respective circular path relative to the door, whereby the crank arms bear against the guide tracks so that the door is lowered downwardly, overcoming the friction of the door seal. For opening the door, the latter must first be lifted in the opposite direction by rotating the lifting shaft. It is desirable to reduce the force necessary, especially for lifting the door, to minimize the physical strength of a person required to operate the door. For this purpose a weight compensation device is provided for cooperation with the lifting operation. The compensating device comprises a spring which is cocked while lowering the door and which helps lifting the door prior to opening the door. The mechanism required for performing the just described several functions is very complex and comprises numerous bearings, shafts, levers, journals, and pivots as well as a cam drive. The situation becomes aggrevated when at least some of the components must be provided in duplicate to meet so-called failsafe requirements. Due to the large number of mechanically effective components and elements, the production costs for such doors are quite high. Further, it has been noted especially in connection with larger passenger doors that the operation of such doors does require a relatively large bodily strength for lifting these doors even if a compensating device is provided with a substantial mechanical advantage.

The above described facts relating to an aircraft door constructed according to the contact principle, apply substantially also to doors constructed for operation in accordance with the toggle principle. Even though the lifting and lowering is not involved in doors operated in accordance with the toggle principle, a substantial technical effort and expense is still necessary in view of the fact that even toggle locked doors require a substantial number of mechanical structural components. Another disadvantage of the toggle principle is seen in that the toggle levers enter into the respective recesses only when the door is precisely positioned. Without such precise positioning the toggle levers cannot be operated. The required precision construction also increases the effort and expense for producing such doors so that they function without fault.

In the light of the above remarks it is clear that for the unlocking and opening, as well as for the closing and locking of an aircraft door, a multitude of different motion sequences are necessary. Conventionally, these motion sequences are mechanically driven and coordinated. Independently of the drive or operating system for an aircraft or spacecraft door, locking hooks, locking cams, and door flaps are involved that must be properly moved by electrically and/or pneumatically operated drive shafts or an operating linkage and these drives must be controllable.

European Patent Publication 0,321,994 (Plude), published on Jun. 28, 1989, describes an aircraft exit door locking system in which the exit door is automatically locked, depending on three dissimilar inputs to a logic system. The input signals are provided from acceleration sensors, pressure sensors, and motion sensors. The outputs of these sensors are utilized in a logic circuit in such a manner that any two of the inputs can determine whether the lock in the passenger door cabin will be energized or deenergized. An opening and closing program sequence is not involved in this type of control.

OBJECTS OF THE INVENTION

In view of the foregoing it is the aim of the invention to achieve the following objects singly or in combination:

- to provide an electric operating mechanism for an aircraft door which will meet safety requirements, yet will require a substantially reduced number of mechanically effective elements to thereby reduce the manufacturing costs of such doors;
- to substantially mechanize and automate the operation and function of such doors so that the person operating such doors will not need to have a substantial body strength;
- to substantially reduce the weight of such doors;
- to electronically control the closing and opening of an aircraft door, the components of which are electrically operated in response to a program stored in a memory of a central processing and control unit;
- to assure a proper door operation under normal and emergency operating conditions;
- to coordinate the sequence of door opening and door closing steps in a stored program that will assure, for example, that all unlocking steps are completed before the door is tilted open;
- to make sure that an emergency slide mechanism is in a "safety" state before any unlocking steps are performed;
- to electrically operate all components under normal operating conditions and, if possible, under emergency operating conditions, and to provide for an emergency opening by a piston cylinder device;
- to minimize and optimally simplify the human effort in the door operation, by integrating such operation into the on-board ECAM system (electronic centralized aircraft monitoring system); and
- to monitor the pressure levels in a pressure reservoir for operating an emergency chute and a piston cylinder device of an emergency door opening and display the monitored pressures on a display panel of the ECAM system.

SUMMARY OF THE INVENTION

An operating mechanism for an aircraft door according to the invention is characterized by the combination of the following features. The door is mounted to the aircraft frame by a supporting guide member which permits an outward swinging for opening the door and an inward swinging for closing the door to assume a position in the aircraft body structure, whereby a form locking is achieved between the door and the aircraft frame structure in the closed position and any loads caused by an internal cabin pressure are taken up by contact or toggle hardware, and wherein all motion transmitting components of the operating mechanism are driven by respective electric motors for the inward and outward swinging of the door, for the closing and opening of the door, and for the locking and unlocking of the door, said motors being program controllable through a central processing unit in which the respective sequence of program steps or of operational steps are stored in an electronic memory.

Each electric motor is controllable individually and in coordination with the control and operation of all the other motors in accordance with the stored program. It has been found that in spite of using a plurality of electromotors, the manufacturing costs have been reduced and the operation has been substantially simplified while simultaneously achieving a reduced structural weight of the door since these motors with their respective gear and/or spindle drives can now be installed substantially directly where the respective operating power is needed, thereby obviating much of the conventionally needed mechanical and/or hydraulic power transmission equipment. More specifically, the weight reduction is due to the fact that the above mentioned mechanical components and elements have been reduced substantially in number and in that the electromotors used instead can be constructed to be rather small and light in weight due to lightweight materials that are conventionally used for such electromotors. A further weight reduction is achieved due to the fact that the above mentioned weight compensation spring mechanism is obviated altogether.

According to a further embodiment of the invention the present system includes a microprocessor that communicates with the following system components, including an interior operating panel in the aircraft, and an exterior operating panel outside the aircraft and wherein the microprocessor or central processing unit has its own power supply, such as a battery. The system components connected to the microprocessor include an electromagnet for activating a pneumatic opening cylinder for opening an aircraft door in an emergency. A first pressure sensor for sensing the pressure in an air pressure source for operating the pneumatic emergency opening cylinder, preferably also a second pressure sensor for sensing the pressure in a pressure source for deploying a chute for emergency purposes, a dump valve for providing communication between a door opening system and a central processing unit, a control computer forming part of the ECAM system in the aircraft for providing communication with a display in the cockpit, with the above mentioned interior and exterior panel, and with the electrical drive system, whereby the opening and closing operation is performed by the drive system comprising several electric motors under the direct control of the microprocessor.

It is an advantage that the electronic control for the door drive motors is simple in its structure and permits an efficient electrical and pneumatic or hydraulic linking between the controlling and controlled components of the system at low effort and expense. The system is reliable in its function and simple in its activation of the doors in all operating situations, whereby the operator controlled components of the system are easily visible and rapidly accessible by an operator.

Where it is not necessary to simultaneously ascertain the pressure of the emergency door opening piston cylinder device and of the drive for deploying the emergency chute, it is possible to connect both pressure sensors through a single conduit to the microprocessor, thereby saving an extra pressure conduit.

Each of the two control panels, namely the interior panel and the exterior panel are equipped for the respective purposes Thus, the interior panel comprises operating components for the door and the slide as well as pressure indicators while the external panel comprises door operating switches only.

The control signals for operating the electric drive motors are digital signals which assure a transmission and processing of the respective digital signals in a manner free of errors. Additionally, the use of digital control signals facilitates the storing of a respective control program in the form of digital values which are easily changed as may be necessary for different control programs for different types of doors, preferably the electric motors are arranged in several groups, which in turn are allocated to the respective door operations. A group comprises at least one electric motor depending on what drives are to be performed. The electric motors may be either fractional horse power d.c. motors or fractional horse power a.c. motors. It is an advantage of the invention that the direct arrangement of the drives where they are needed permits the use of substantially smaller rated motors than was necessary heretofore.

Preferably, stepping motors are used for performing a stepwise rotational drive movement. Stepping motors are most efficiently controlled by a digital control.

Another advantage of the invention is seen in utilizing the ECAM system conventionally provided in an aircraft for an electronic, central aircraft monitoring. Such a system will now also indicate the status of the individual doors as well as of the emergency chute or chutes. The particular status may now be displayed digitally or in an analog form, whereby the respective digital signals will be converted first if an analog display is intended.

BRIEF DESCRIPTION OF THE DRAWINGS

In order that the invention may be clearly understood, it will now be described, by way of example, with reference to the accompanying drawings, wherein:

FIG. 4 is a sectional view along section line IV—IV in FIG. 3;

DETAILED DESCRIPTION OF PREFERRED EXAMPLE EMBODIMENTS AND OF THE BEST MODE OF THE INVENTION

Figure 1:
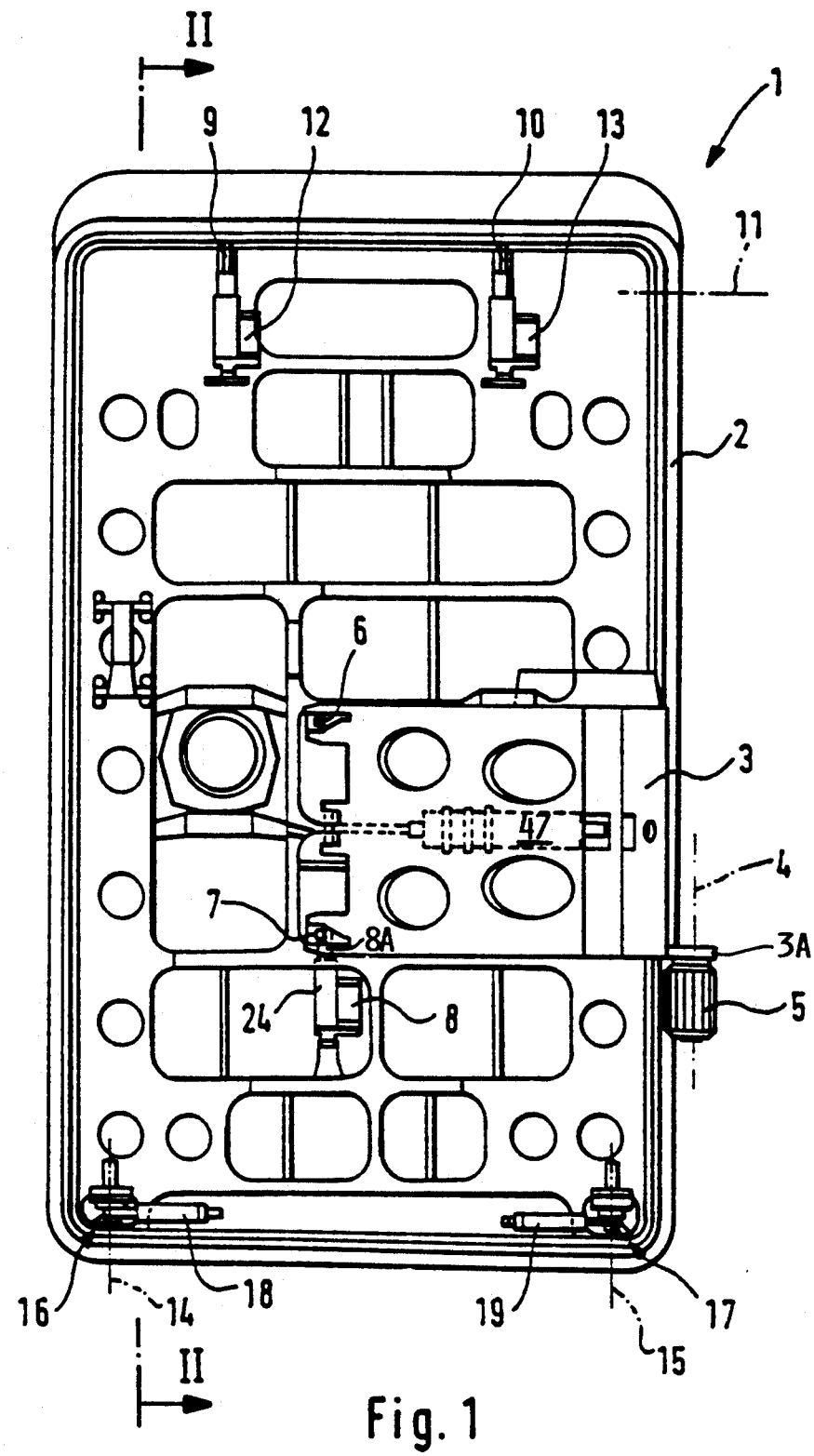
FIG. 1 is a plan view of an electromotor drive mechanism according to the invention installed in an aircraft door lockable by contact hardware.
Figure 2:
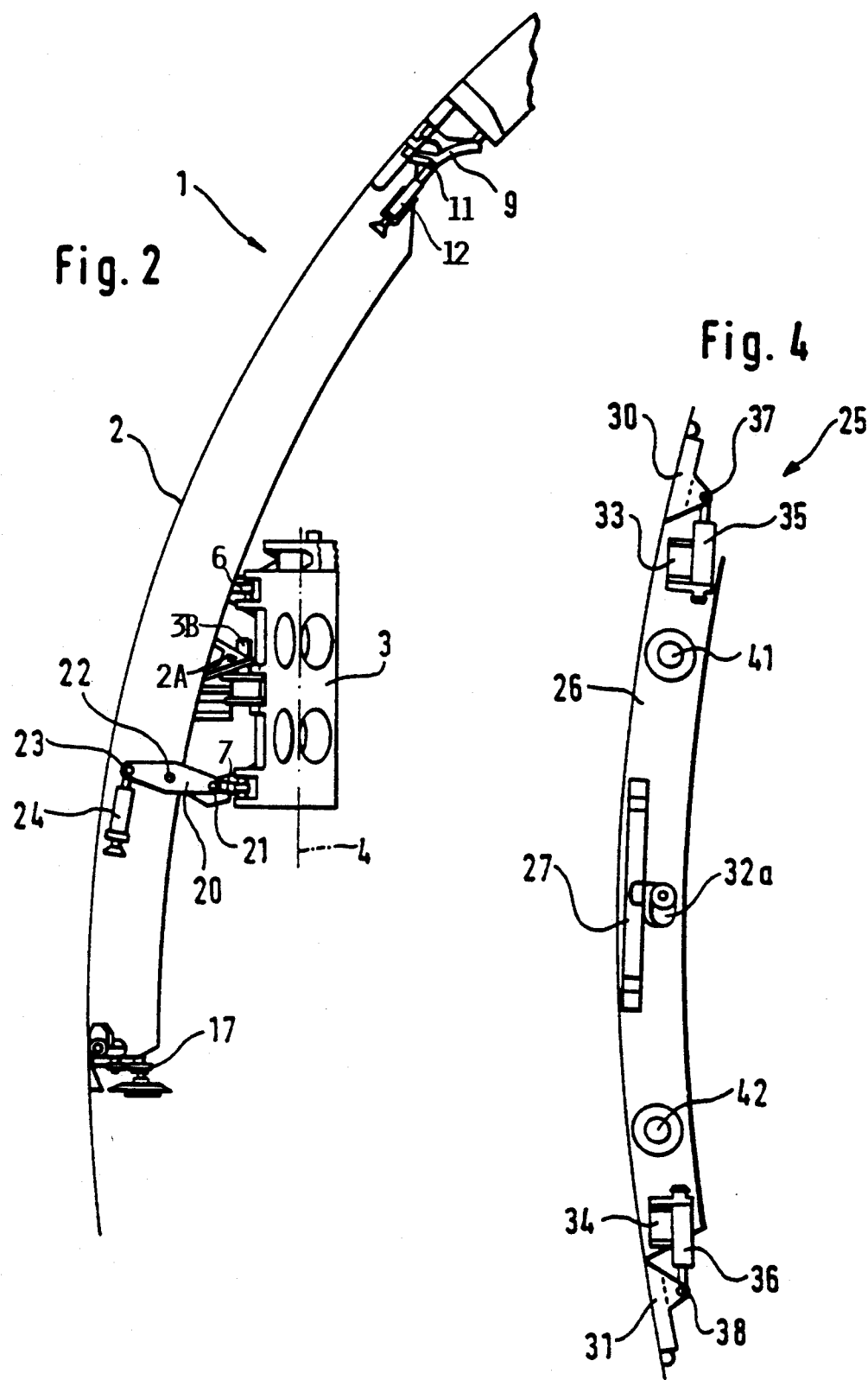
FIG. 2 is a sectional view along section line II—II in FIG. 1.

The aircraft door 1 shown in FIGS. 1 and 2 is constructed in accordance with the contact principle whereby the door is depicted in the closed and locked condition. The door 1 of FIG. 1 is seen as viewed from the inside out of an aircraft cabin, whereby the aircraft body structure surrounding the door opening and the inner covering of the door have been omitted to simplify the illustration. The door 1 comprises a door frame structure 2 carrying the functional units to be described below. The door 1 with its door frame 2 is connected to the aircraft body structure by hinging elements 3 functioning as a supporting and guiding hinge, one end of which is connected to the aircraft body structure, while the other end is connected to the door frame 2. The supporting and guiding hinging element 3 carries the weight of the door during swinging out and swinging in. The supporting and hinging element 3 is hinged to a hinging axis 4 rigidly connected to the aircraft body. The axis 4 is shown symbolically by a dash-dotted line. An electromotor 5 mounted to the aircraft body is connected to drive a hinge arm 3A of the hinging element 3. The electric motor 5 provides the power for swinging the door open or closed. Preferably a reduction gear is used.

The door connected end of the hinging element 3 is secured to the door frame 2 by universal joints 6 and 7 through respective three-point guide links 20. These guide links 20 form, together with the hinging element 3 and the door frame 2, a pivoting quadrangle in the form of a parallelogram, whereby the door 1 is exactly guided when it is lifted relative to the hinging element 3. The power required for lifting and lowering the door is provided by a further electric motor 8 mounted to the door frame 2 and driving a push rod 8A through a spindle drive 24. The push rod 8A is connected to the lower three-point guide link 20 so that it can see-saw up or down about an axis 22 rigidly connected to the door. This see-sawing of the three-point guide link 20 is transmitted to the lower universal joint 7 for lifting and lowering the door.

Two locking hooks 9 and 10 are arranged in the upper portion of the door 1. The locking hooks 9 and 10 are tiltable about a horizontal axis 11 rigidly secured to the door frame 2. When the locking hooks 9 and 10 are in their locked state, they engage respective contour elements, not shown, but rigidly secured to the aircraft body. The tilting of the locking hook 9 about the horizontal axis 11 is accomplished by an electromotor 12. Similarly, the tilting of the locking hook 10 about the horizontal axis 11 is accomplished by its own electric motor 13.

Two emergency slide operating levers 16 and 17 are mounted to the door frame 2 at its lower end for journalling about vertical axis 14 and 15 respectively. An electric motor 18 drives the tilting motion of the slide lever 16. An electric motor 19 drives the tilting motion of the slide lever 17. Piston cylinder device 47 opens the door in an emergency.

FIG. 2 shows the connection of the universal joint 7 on the one hand to the supporting and guiding hinging element 3 and on the other hand to the above mentioned guide link 20 or rather three-point connecting link 20.

The connecting link 20 is pivoted at 21 to the universal joint 7. The opposite end of the connecting link 20 is pivoted at 23 to the spindle drive 24 which is driven by the motor 8 shown in FIG. 1. The connecting link 20 is journalled at 22 to the door frame 2 so that it is able to move in see-saw fashion in response to rotation of the spindle drive 24 to move the door vertically up or down. For this purpose, the door frame 2 is connected through a bracket 2A to a vertical stud 3B which guides the vertical up and down movement of the door frame 2 through the bracket 2A. Similarly, the universal joint 6 is so constructed that it permits a sufficient vertical up and down displacement of the door in a guided manner relative to the hinging element 3 that is journalled at the hinging axis 4 to the aircraft body. The connecting three-point link 20 can be tilted clockwise or counter-clockwise about the journal axis 22 by the motor 8 through the drive spindle 24. A clockwise lifting of the left-hand end 23 of the link 20 will lift the door 1. A counter-clockwise movement of the link 20 will lower the door. Thus, all motions to be made by the door 1 are performable in response to the drive of the respective electric motors. These electric motors are operated in response to a stored program in a central processing unit described below. An aircraft attendant merely has to push one button to cause the required operational sequence for opening the door and another button for closing the door.

Figure 3:
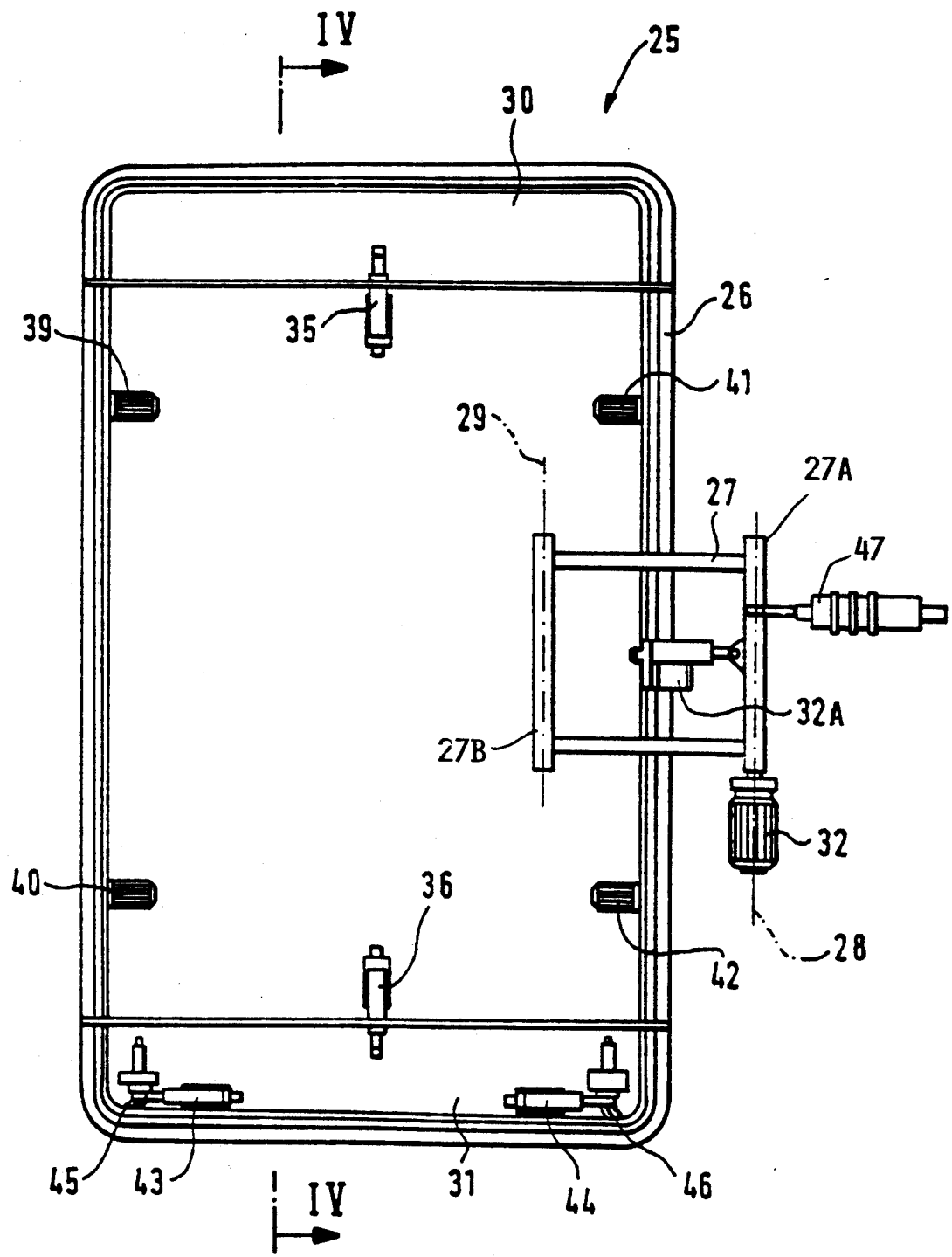
FIG. 3 is a view similar to that of FIG. 1, but showing an electromotor drive mechanism according to the invention installed in a door which is locked in accordance with the toggle principle mentioned above.

FIGS. 3 and 4 illustrate an aircraft door 25 constructed to be locked in accordance with the toggle principle. The door 25 comprises a door frame structure 26 hinged to the aircraft body structure by a supporting and guiding hinging element 27 having a first vertical member 27A hinged to the aircraft body at a hinging axis 28. The element 27 has a second vertical member 27B hinged to the door frame 26 at a hinging axis 29. The upper edge of the door 25 is constructed as a movable flap for shortening the vertical length of the door when the flap is in a recessed position. Similarly, the lower edge of the door is constructed as a recessable flap for also reducing the vertical length of the door 25. All operations for opening and closing the door 25 are performed by electric motors as follows.

The supporting and guiding hinging element 27 is tiltable or rather hingeable about the hinging axis 28 by an electric motor 32 operatively connected to the vertical member 27A of the hinging element 27. The motor housing is rigidly secured to the aircraft body. A further electric motor 32A provides the power for controlling a hinging movement of the door 25 relative to the aircraft body structure or hinging element 27.

The movement of the upper door section 30 between an operative position shown in FIG. 4 and a recessed position, not shown, is accomplished by an electric motor 33 and a spindle drive 35 journalled to the upper section 30 at the pivot 37. Similarly, the movement of the lower door section 31 back and forth between the operative position shown in FIG. 4 and a recessed position is accomplished by an electric motor 34 through a spindle drive 36 journalled to the lower section 31 at the pivot 38.

The door 25 comprises four so-called toggles of conventional construction not shown, for forcing the door into a sealed and locked condition relative to the aircraft body structure. Each of the locking toggles is driven by its respective electric motor 39, 40, 41, and 42.

All electric motors are operating through respective gear drives or spindles to obtain the required torque moments or adjustment forces. These gear drives or spindles provide a translation of the rotation of the motor output shaft into a slower motion. With regard to the electric motors 39 to 42, driving the locking toggles, respective gear drives are provided for obtaining the proper toggle motion into and out of the locked position.

As shown in FIG. 3, two further electric motors 43 and 44 are provided for driving respective emergency slide mechanisms 45 and 46.

The two example embodiments illustrate quite clearly that expensive and complicated machine elements have been replaced by small electric motors cooperating with respective gear or spindle drives to provide the required power for the operating motions of the door. It is required that the motors with their gear or spindle drives perform the required motions exactly. However, such exact motions are controlled according to the invention by computer controlled automation components such as the mentioned motors, gear drives, and spindle drives. For example, the motors 39 to 42 for operating the locking toggles may be constructed as stepping motors so that by by responding to the respective programs stored in digital form these motors perform the respective number of revolutions simultaneously and in synchronism with each other in order to bring the respective toggles into the required locking or unlocking position.

With regard to the just mentioned control possibilities, the supporting and guiding hinging element 27 is constructed as a parallelogram also referred to as an artificial parallelogram.

For operating such a parallelogram the required angular motion of the element 27 around the hinging axis 28 is measured to provide a control signal for the motor 32A in such a manner that the motor 32A tilts the door 25 relative to the support and guiding hinging element 27 to such an extent that the door during the swinging motion of the hinging element 27 does not perform a rotation relative to the aircraft body.

Figure 5:
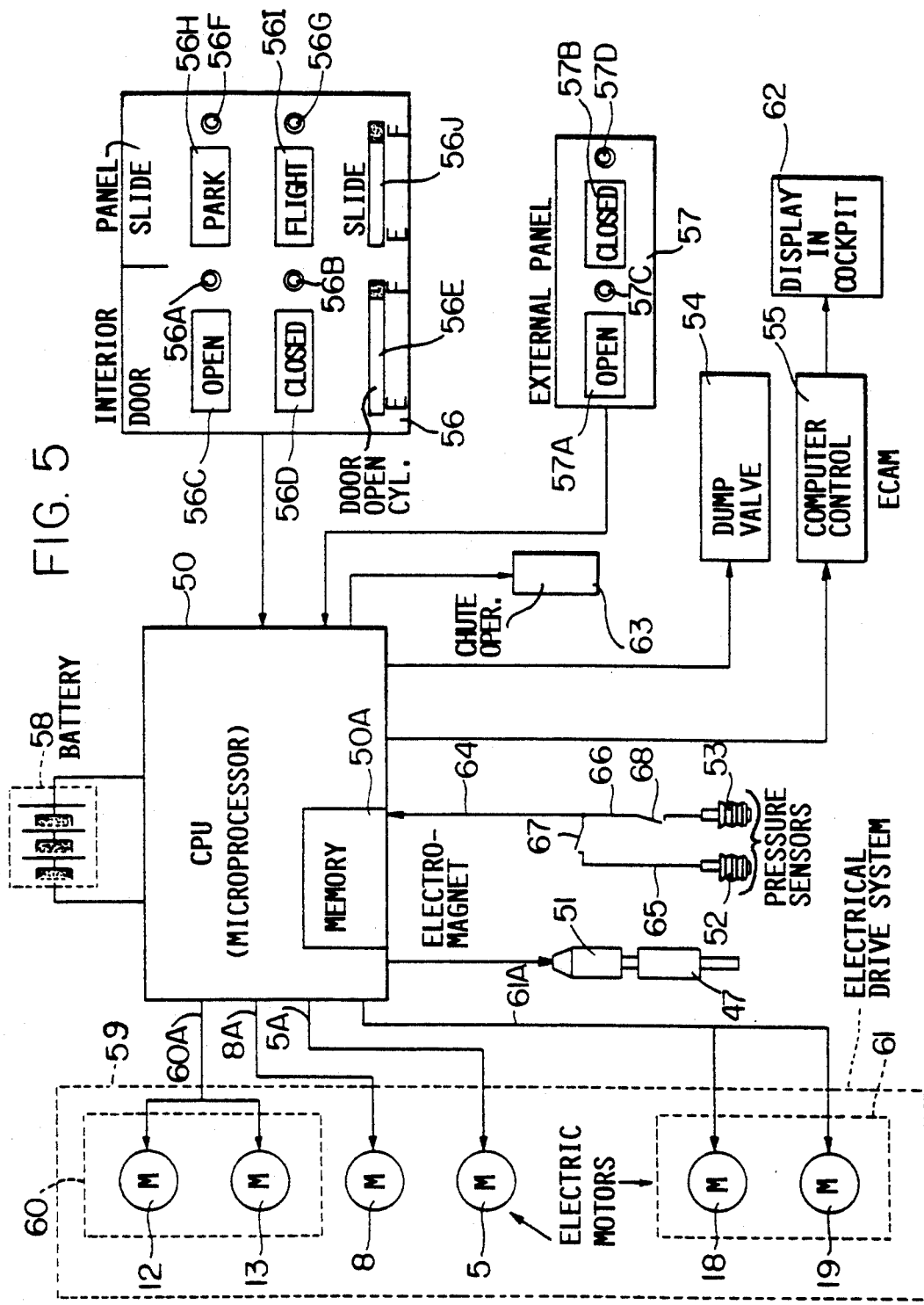
FIG. 5 is a block circuit diagram of the present control system for the operation of an aircraft door as shown in FIGS. 1, 2, or 3.

Referring to FIGS. 1 and 5 in conjunction, the electric motors 5, 8, 12, 13, 18, 19 shown in the door of FIG. 1, are controlled according to the invention by the central processing unit 50 shown in FIG. 5. The central processing unit 50 is a microprocessor comprising a memory 50A in which the control programs are stored and a battery 58 for an emergency power supply.

A first panel 56 controlled by an operator is arranged inside the aircraft. Panel 50 has indicator lights 56A and 56B to show whether the door is open or closed. Control switches or buttons 56C, 56D operated by a flight attendant are provided for opening or closing the door. A pressure indicator 56E shows a pressure value sensed by a first pressure sensor 52 to be described in more detail below. The right-hand side of the interior panel 56 has optical indicators 56F and 56G indicating the status of the emergency slide or chute not shown. Control switches 56H and 56I for operation by a flight attendant control the activation or deactivation of the emergency slide or chute. An indicator 56J shows whether the pressure activated slide control mechanism is provided with the required pressure as sensed by the sensor 53. E and F stand for empty and full respectively for indicating the respective pressure status.

A second, external panel 57 is also connected to the microprocessor 50 The panel 57 is arranged outside of the aircraft and has two switches 57A and 57B for opening and closing the door from the outside. Indicators 57C and 57D show the respective door status.

The piston cylinder device 47 that is also shown in FIG. 1 for opening the door in an emergency, is also controlled through the central processing unit 50, more specifically through an electromagnet 51 that receives its control signal from the central processing unit 50. The magnet 51 operates the respective valve for supplying the required pressure medium to the piston cylinder device 47. A chute operating mechanism 63 is similarly controlled through the CPU 50.

The pressure sensor 52 monitors the pressure supply for the piston cylinder device 47. The second pressure sensor 53 monitors the pressure supply for the chute operating mechanism 63. Two sensor branch lines 65 and 66 connect the two pressure sensors 52 and 53, respectively, through a common sensor line 64 to the CPU 50. These lines are electrical conductors to supply a pressure representing electrical signal to the CPU 50. Switches 67, 68 in the branch lines 65, 66 respectively, are operated through the CPU 50 to determine which pressure is sensed. As shown, the switch 67 is open and the switch 68 is closed so that the signal from the sensor 53 is supplied to the CPU 50. When the status of the switches 67 and 68 is reversed, the signal from the sensor 52 passes through to the CPU.

A so-called "dump" valve 54 to be described in more detail below, is also connected to the CPU 50 and so is the control computer 55 of the aircraft's ECAM system for supplying door status information to a display 62 in the cockpit of the aircraft.

The electric drive motors 5, 8, 12, 13, 18, and 19 also shown in FIG. 1, form a drive system 59 controlled by the CPU 50. Four groups of motors are formed. Motor group 60 comprises the motors 12 and 13 which are driven in synchronism and are connected for this purpose through a control electrical conductor 60A to the CPU. Motors 18 and 19 form a group 61 also driven in synchronism and controlled through a conductor 61A connected to the CPU. Each of the motors 5 and 8 forms a separate group connected through the control conductors 5A and 8A respectively to the CPU.

The above mentioned pressure sensors 52 and 53 provide the actual available pressure values in the form of respective signals to the CPU 50, thereby indicating the operational status of the pressure source for the emergency piston cylinder device 47 and the chute operating mechanism 63.

The so-called dump valve 54 is integrated into the door closing system in such a way that pressurization of the aircraft can take place only if the doors are properly closed and locked. Similarly, these valves make sure that the door cannot be opened prior to cabin depressurization. The computer control system 55 is part of the aircraft's ECAM system as mentioned above. This system informs the CPU 15 about the actual instantaneous operating condition of the various aircraft components. The invention utilizes this conventionally provided system for also displaying the operational status of the door closing and opening device 47 and of the chute deployment mechanism 63.

With regard to the interior panel 56 it should be mentioned that the components for the door operation are arranged in a substantial vertical orientation on the left hand side of the panel while the components relating to the slide or chute operation are arranged on the right-hand side of the panel also in a substantial vertical orientation. The pressure indicators 56E for the piston cylinder device 47 and 56J for the chute deployment mechanism 63, provide continuous information regarding the operational status of the emergency operating mechanisms 47, 63. The operator controlled switches are preferably lit switches. The same applies to the switches 57A, 57B on the external panel 57.

As mentioned above, the motor 5 with its reduction gear swings the door open or closed. The motor 8 driving the spindle 24 lifts or lowers the door. The motor 12 tilts the hook 9 and the motor 13 tilts the hook 10. Motors 18 and 19 operate the emergency slide through levers 16 and 17. The just mentioned four components thus form part of the chute or slide operating mechanism 63. The lifting and lowering of the door is preferably accomplished with a spindle drive. The motors 8, 12, 13, 18 and 19 operate through respective gear drives and ball spindles for transmitting the respective control power to the locking elements and to the chute or slide activating or deploying mechanism. A so-called ball spindle has a self-locking characteristic, making it possible to hold the respective driven components, such as the locking elements, in any safe position independently of the electrical power supply. Further, the slide or chute levers 16 and 17 position the slide on an emergency chute rail in the safety on or safety off position. An electromagnetic clutch may be provided between the motor 5 for swinging the door open or closed and the respective door hinging element 3. The above mentioned reduction gear between the motor 5 and the hinge 4 assures the required torque moment.

Figure 8:
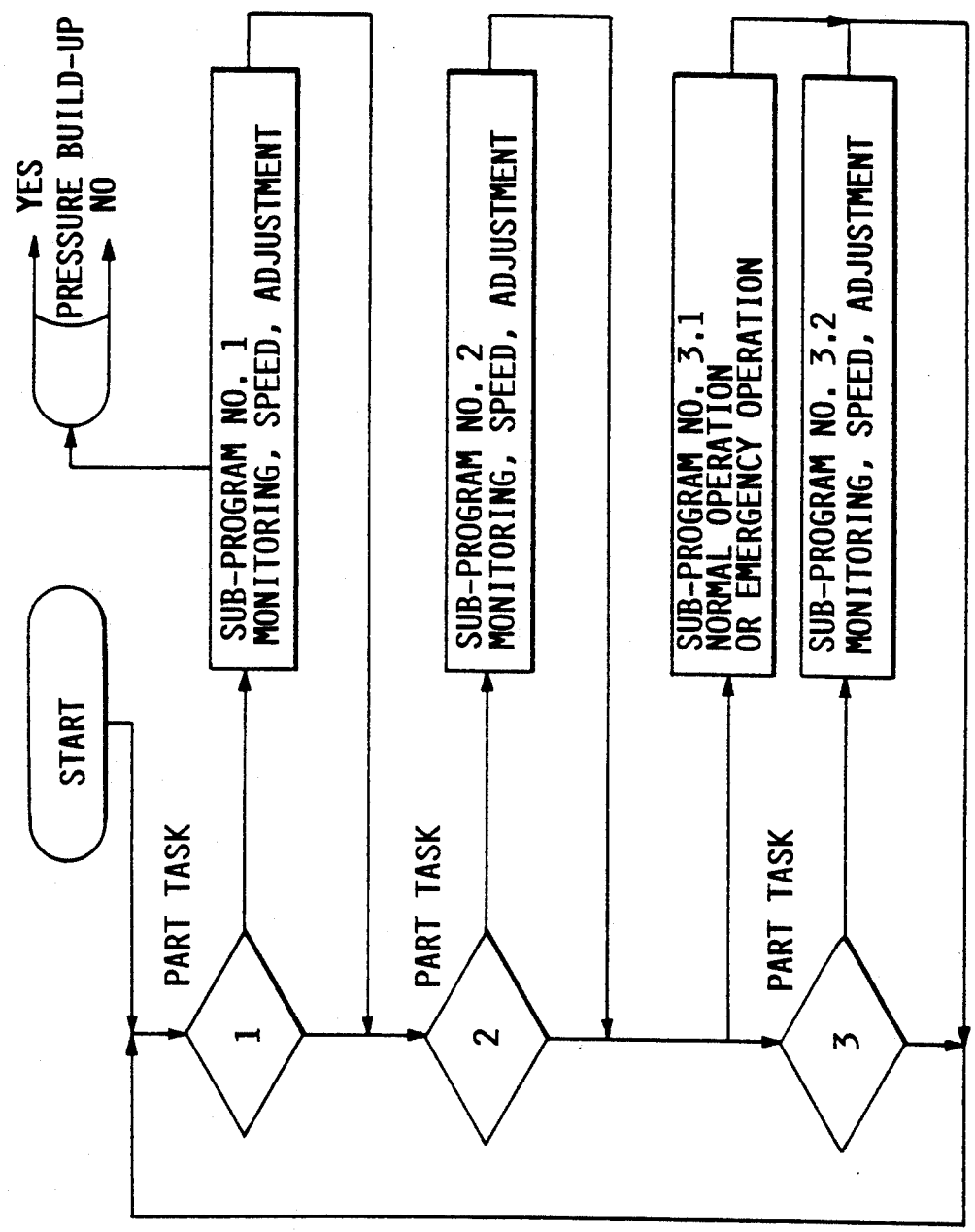
FIG. 8 is a flow diagram of the present control operation performed by the system of FIG. 5.

The just outlined components are all controlled by the CPU 50 in accordance with the flow diagram shown in FIG. 8 illustrating a door opening operation. A door closing operation proceeds in the reverse direction. The first partial task involves the unlocking of the locking hooks 9 and 10 and this partial task is performed by the servomotors 12 and 13. The second partial task involves the lifting of the door which is performed by the servomotor 8. The third partial task involves the swinging open of the door which is performed by the servomotor 5. The just mentioned operations are performed in a logical sequence and that sequence is monitored by the CPU 50 in accordance with the respective door opening program stored in the memory 50A. In this connection it must be assured that the unlocking of the hooks 9 and 10 is completed before the door can be lifted and the lifting must be completed before the door can be swung open. Further, when the door is opened under normal operating conditions on the ground through the external panel 57, it must be assured that the chute operating system 63 keeps the chute in the safety on condition before any unlocking of the door may begin. These operations in addition to the monitoring of the respective pressures through the sensors 52 and 53, are all performed by the CPU 50, which also causes the display of the respective pressure conditions at 56E and 56J on the interior panel 56. The CPU 50 also controls the pressurization and depressurization of the aircraft cabin and these pressure controls of the interior pressure in the cabin must be correlated to the status of the doors. Pressurization cannot take place until the doors are completely closed and locked. Thus, the dump valves 54 can be closed only when the doors are in the completely closed and locked condition.

As mentioned above, the present system for the program controlled operation of the doors is integrated with the conventionally provided ECAM system on board of an aircraft that now cooperates with the CPU 50 for the door control according to the invention.

The above mentioned battery 58 makes sure that in an emergency when the normal power supply on board of an aircraft is not available, the doors can be unlocked and opened. Further, in an emergency the doors are not opened by the motor 5, but rather by the piston cylinder device 47 which is preferably a pneumatically operated device which provides the necessary power for swinging the doors open even under adverse operating conditions, for example, when the aircraft is in a slanted position after an emergency landing or when there is a substantial side wind against which the doors must be swung open. The capacity of the battery 58 for these purposes is relatively small, since the power for swinging the door open comes from the pneumatic pressure source and the power needed for operating the motors 8, 12, and 13 is relatively small.

Figure 6:
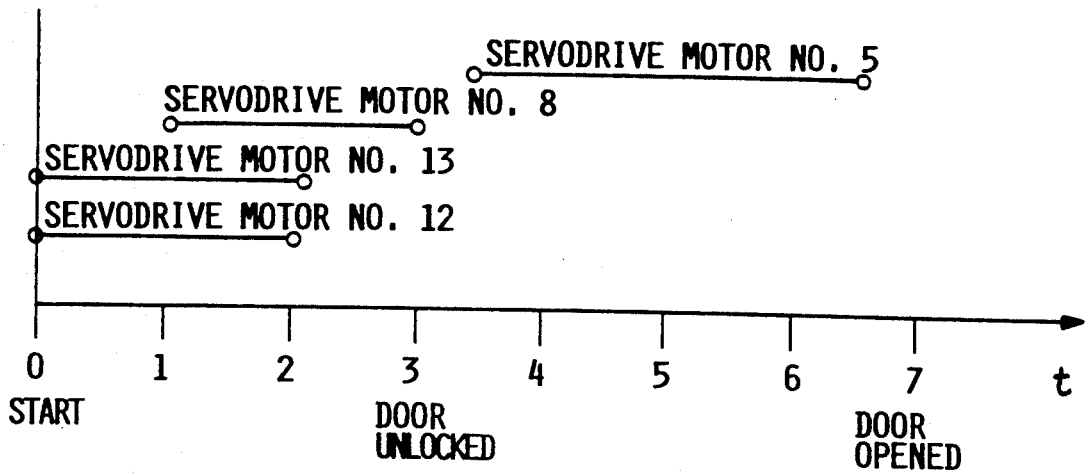
FIG. 6 is a timing diagram showing the energization of the various drive motors involved in an unlocking and opening of an aircraft door under normal operating conditions.
Figure 7:
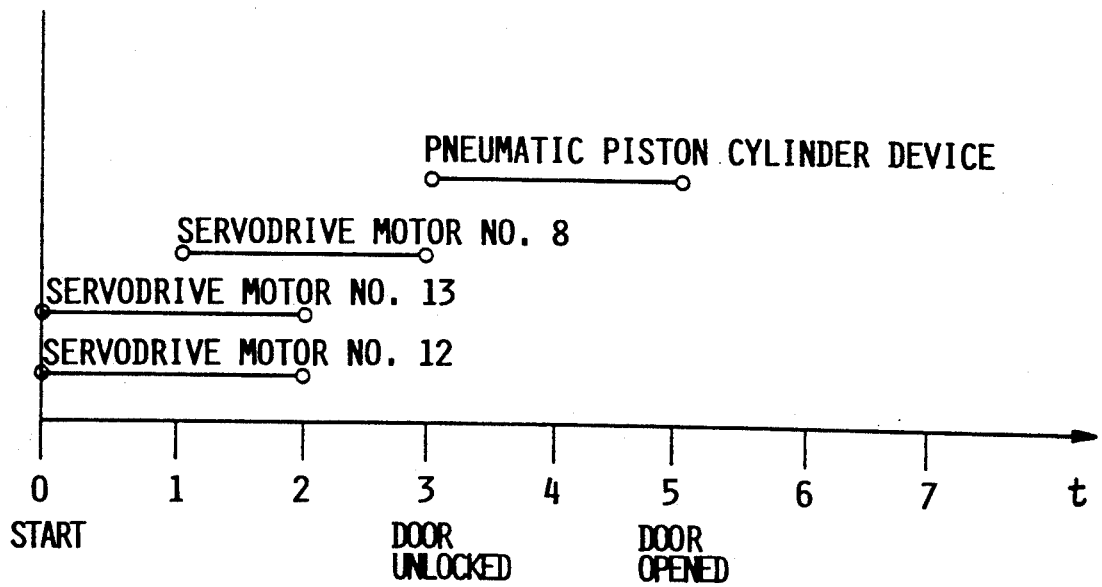
FIG. 7 is a timing diagram similar to that of FIG. 6, however, showing the activation of the various motors in case of an emergency for unlocking and opening the aircraft door.

FIG. 6 shows the timing sequence for the unlocking and opening of the door under normal operating conditions. Similarly, FIG. 7 illustrates the timing sequence of the door when the pneumatic piston cylinder device 47 must be activated in an emergency. The servo drive motor 5 is not activated at all in the situation depicted in FIG. 7.

The motors 5, 8, 12, 13, 18, and 19 are preferably fractional horsepower a.c. or d.c. servomotors responsive to the various control signals from the CPU 50 for performing the above outlined functions.

Although the invention has been described with reference to specific example embodiments, it will be appreciated that it is intended to cover all modifications and equivalents within the scope of the appended claims.

What we claim is:

1. An operating system for an aircraft door having a door frame, comprising door supporting and guiding hinging means for securing said door frame to a body structure of the aircraft, a plurality of electric motor means for operating said door, operating means driven by said electric motor means for performing door opening and door closing functions and door locking and unlocking functions, emergency door opening pressurized drive means (47) for opening said door in an emergency, and a central computer processing unit (50) comprising an electronic memory having a computer program stored therein, said door operating system further comprising input means (56, 57) connected to said central processing unit for providing operator initiated input signals to said central processing unit, emergency power supply means (58) as part of said central processing unit (50), electromagnet means (51) connected to said central processing unit for activating said emergency door opening pressurized drive means (47), a first pressure sensor (52) for sensing a pressure value for said emergency door opening pressurized drive means (47) and for providing a respective first pressure value signal to said central processing unit, dump valve means (54) connected to said central processing unit for preventing a door opening prior to a completion of a cabin depressurization, display means (55, 62) connected to said central processing unit for displaying door status information on said display means, and conductor means connecting said electric motor means to said central processing unit (50) for operating said electric motor means in response to said computer program, whereby each of said electric motor means is controlled individually and in coordination with the control and operation of all of said electric motor means in accordance with said stored computer program.

2. The operating system of claim 1, further comprising an emergency chute and pressurized means for deploying said emergency chute, second pressure sensor means (53) for sensing a further pressure value for said pressurized means and connected to said central processing unit for providing a respective second pressure value signal to said central processing unit.

3. The operating system of claim 2, further comprising a single conductor for connecting said first and second pressure sensors (52, 53) to said central processing unit to supply said pressure value signals to said central processing unit, and wherein a branch conductor leads from said single conductor to one of said pressure sensors.

4. The operating system of claim 2, wherein said input means (56, 57) comprise at least one control panel forming an interior control panel (53) comprising means for providing manually produced door control signals, first means for visually displaying a door status, second means for visually displaying a safety-on and safety-off status of said emergency chute, and third means for visually displaying at least one pressure value signal.

5. The operating system of claim 4, wherein said input means comprise a further exterior control panel comprising means for providing manually produced door control signals and means for visually displaying a door status.

6. The operating system of claim 1, wherein said plurality of electric motor means comprise four groups of motors, whereby a motor group comprises at least one electric motor, and four control conductor means, one control conductor means connecting each motor group to said central processing unit for said coordination in controlling said electric motors in accordance with said computer program.

7. The operating system of claim 6, wherein said control conductors provide program responsive digital control signals from said CPU to said motor groups.

8. The operating system of claim 1, wherein said plurality of electric motor means comprise fractional horsepower d.c. electric motor means.

9. The operating system of claim 1, wherein said plurality of electric motor means comprise fractional horsepower a.c. electric motor means.

10. The operating system of claim 1, wherein said plurality of electric motor means comprise electric stepping motor means.

11. The operating system of claim 1, wherein said plurality of electric motor means comprise fractional horsepower servomotor means.

12. The operating system of claim 1, wherein said display means comprise computer means and a cockpit display screen forming part of an ECAM system of an aircraft, for visually displaying a door status in the cockpit.

* * * * *